(12) United States Patent
Tang

(10) Patent No.: US 10,330,955 B2
(45) Date of Patent: Jun. 25, 2019

(54) SPECTACLES WITH PERSONAL ACCESSORIES

(71) Applicant: Feng Tang, Wenzhou (CN)

(72) Inventor: Feng Tang, Wenzhou (CN)

( * ) Notice: Subject to any disclaimer, the term of this patent is extended or adjusted under 35 U.S.C. 154(b) by 158 days.

(21) Appl. No.: 15/410,650

(22) Filed: Jan. 19, 2017

(65) Prior Publication Data
US 2018/0095298 A1    Apr. 5, 2018

(30) Foreign Application Priority Data
Sep. 30, 2016    (CN) .................. 2016 2 1095880 U

(51) Int. Cl.
| | |
|---|---|
| G02C 11/00 | (2006.01) |
| B43K 29/00 | (2006.01) |
| G02C 5/14 | (2006.01) |
| G02C 11/04 | (2006.01) |
| G06F 3/0354 | (2013.01) |
| H04R 1/10 | (2006.01) |
| G06F 1/16 | (2006.01) |
| B43K 25/00 | (2006.01) |

(52) U.S. Cl.
CPC .............. *G02C 11/00* (2013.01); *B43K 25/00* (2013.01); *B43K 29/003* (2013.01); *G02C 5/146* (2013.01); *G02C 11/04* (2013.01); *G06F 1/163* (2013.01); *G06F 3/03545* (2013.01); *H04R 1/105* (2013.01); *H04R 1/1066* (2013.01); *G02C 2200/02* (2013.01); *G06F 2200/1632* (2013.01); *H04R 1/1016* (2013.01); *H04R 1/1033* (2013.01); *H04R 2420/07* (2013.01)

(58) Field of Classification Search
CPC ........ G02C 11/00; G02C 5/146; G02C 11/04; G02C 2200/02; H04R 1/105; H04R 1/1066; H04R 1/1016; H04R 1/1033; H04R 2420/07; B43K 29/003; G06F 3/03545
USPC ......................................................... 351/158
See application file for complete search history.

(56) References Cited

U.S. PATENT DOCUMENTS

2007/0013864 A1* 1/2007 Dietz ..................... G02C 11/00
                                                                 351/155

* cited by examiner

*Primary Examiner* — Wen Huang
(74) *Attorney, Agent, or Firm* — Tsz Lung Yeung

(57) ABSTRACT

A spectacles set includes a spectacles article, a first personal accessory and a second personal accessory. The spectacles article includes a pair of spectacles lenses, a front frame, a first temple and a second temple, and a first frame magnetic element provided on one of the first temple and the second temple at a position in the vicinity of the front frame. The first personal accessory includes a writing instrument and a first accessory magnetic element provided on the writing instrument. The second personal accessory includes a lighting device and a second accessory magnetic element provided on the lighting device. The writing instrument and the lighting device interchangably attach on the first frame magnetic element so that at least one of the first personal accessory and the second personal accessory is attached on the spectacles article for providing a user with a utility option.

2 Claims, 5 Drawing Sheets

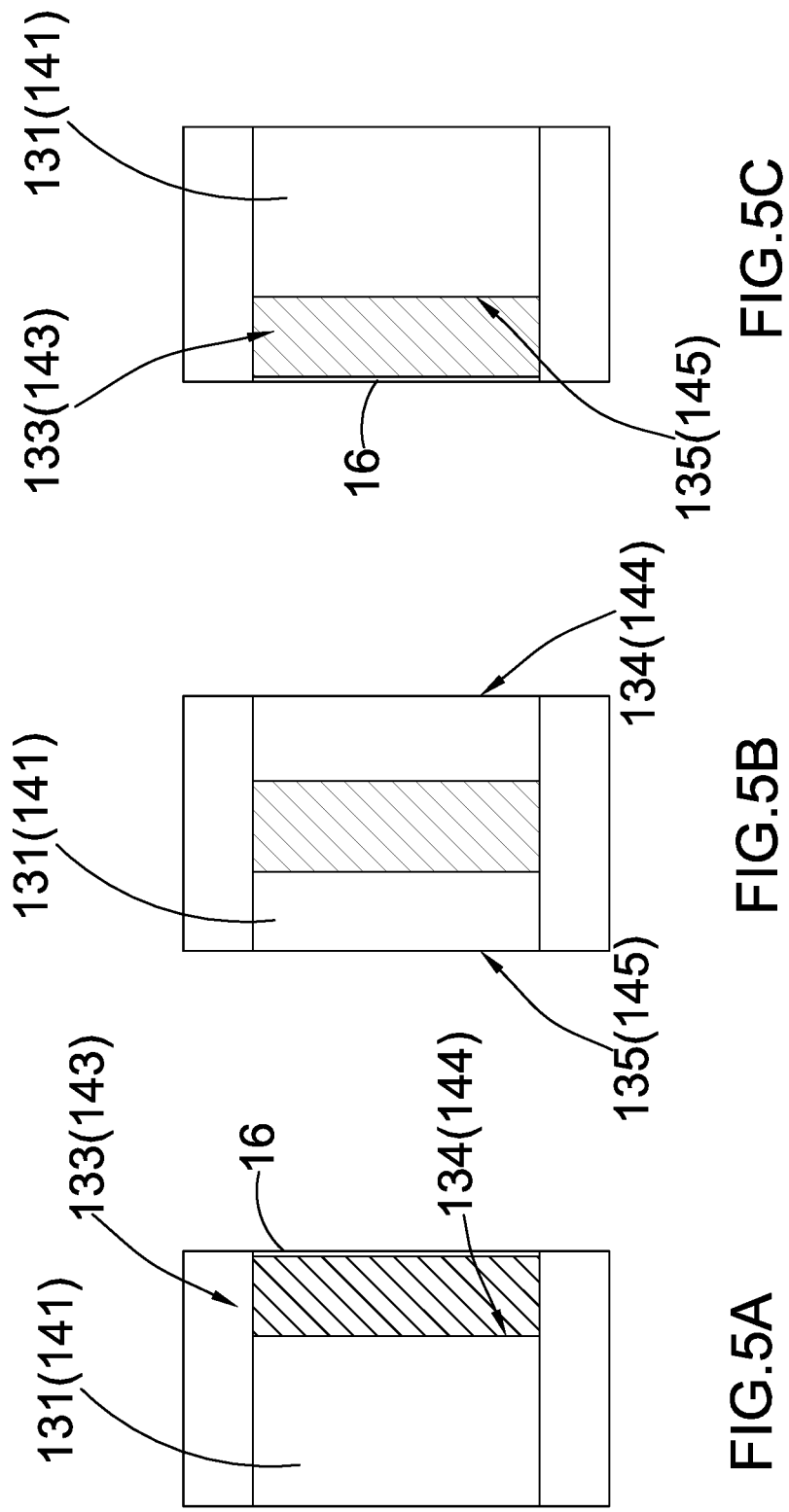

SPECTACLES WITH PERSONAL ACCESSORIES

BACKGROUND OF THE PRESENT INVENTION

Field of Invention

The present invention relates to spectacles, and more particularly to a spectacles set with interchangeable personal accessories which are adapted to aid a user under various circumstances.

Description of Related Arts

Spectacles (or glasses) are common daily tools which helps correct vision and protects a user's eyes from bright sunlight or ultraviolet radiation. Various accessories have been developed for spectacles. As these accessories become more and more common, there is an increase in the demand of a higher personal customization to spectacles accessories not just for decorative purposes or fashion but also for utility purposes.

The majority of conventional spectacles cannot be customized at all. Most of them are sold as they were manufactured. Most of the conventional spectacles share usual elements such as a front frame sitting on a user's nose for holding the lenses, a pair of foldable temples connecting to the front frame for hooking on the back of the user's ears. Due to the limitation of human anatomy, the shapes and sizes of spectacles are often limited. Due to comfort and safety, the weight of spectacles has to be minimized. Therefore, it is very difficult to connect personal accessories to these conventional spectacles from a utility standpoint.

Another major disadvantage of convention spectacles is its storage problem. Spectacles can be safely stored in a protective case or box. However, it is not convenient for the user to carry around the case all the time. And if the spectacles are left unattended on a desk or sofa, they might be damaged easily as the frames or lenses are usually fragile.

As a result, there is a need to improve upon the above-mentioned conventional spectacles so that spectacles may attach some personal accessories for business or personal uses.

SUMMARY OF THE PRESENT INVENTION

Certain variations of the present invention provide a spectacles set with interchangeable personal accessories which are adapted to aid a user under various circumstances.

Certain variations of the present invention provide a spectacles set in which a spectacles article may be selectively and interchangeably equipped with one of a number of personal accessories so that a user may select the most desirable personal accessory to achieve his utility aim.

Certain variations of the present invention provide a spectacles set in which the personal accessories may be easily and quickly attached and detached on a spectacles frame.

In one aspect of the present invention, it provides a spectacles set, comprising:

a spectacles article, which comprises:

a pair of spectacles lenses;

a front frame, the spectacles lenses mounting on the front frame;

a first temple and a second temple rearwardly extended from two sides of the front frame respectively; and a first frame magnetic element provided on one of the first temple and the second temple at a position in the vicinity of the front frame;

a first personal accessory which comprises a writing instrument and a first accessory magnetic element provided on the writing instrument; and a second personal accessory which comprises a lighting device and a second accessory magnetic element provided on the lighting device, the writing instrument and the lighting device being interchangably attached on the first frame magnetic element so that at least one of the first personal accessory and the second personal accessory is attached on the spectacles article for providing a user with a utility option.

In another aspect of the present invention, it provides

In one aspect of the present invention, it provides a spectacles set, comprising:

a spectacles articles, which comprises:

a front frame;

a first temple and a second temple rearwardly extended from two sides of the front frame respectively; and a first frame magnetic element provided on one of the first temple and the second temple at a position in the vicinity of the front frame;

a first personal accessory which comprises a writing instrument and a first accessory magnetic element provided on the writing instrument; and a second personal accessory which comprises a lighting device and a second accessory magnetic element provided on the lighting device, the writing instrument and the lighting device being interchangably attached on the first frame magnetic element so that at least one of the first personal accessory and the second personal accessory is attached on the spectacles article for providing a user with a utility option.

This summary presented above is provided merely to introduce certain concepts and not to identify any key or essential features of the claimed subject matter.

BRIEF DESCRIPTION OF THE DRAWINGS

FIG. 5A to FIG. 5C are schematic diagrams of the frame magnetic member according to the preferred embodiment of the present invention, illustrating that the frame magnetic members may be positioned at various positions on the first temple or the second temple.

DETAILED DESCRIPTION OF THE PREFERRED EMBODIMENT

Figure 1:
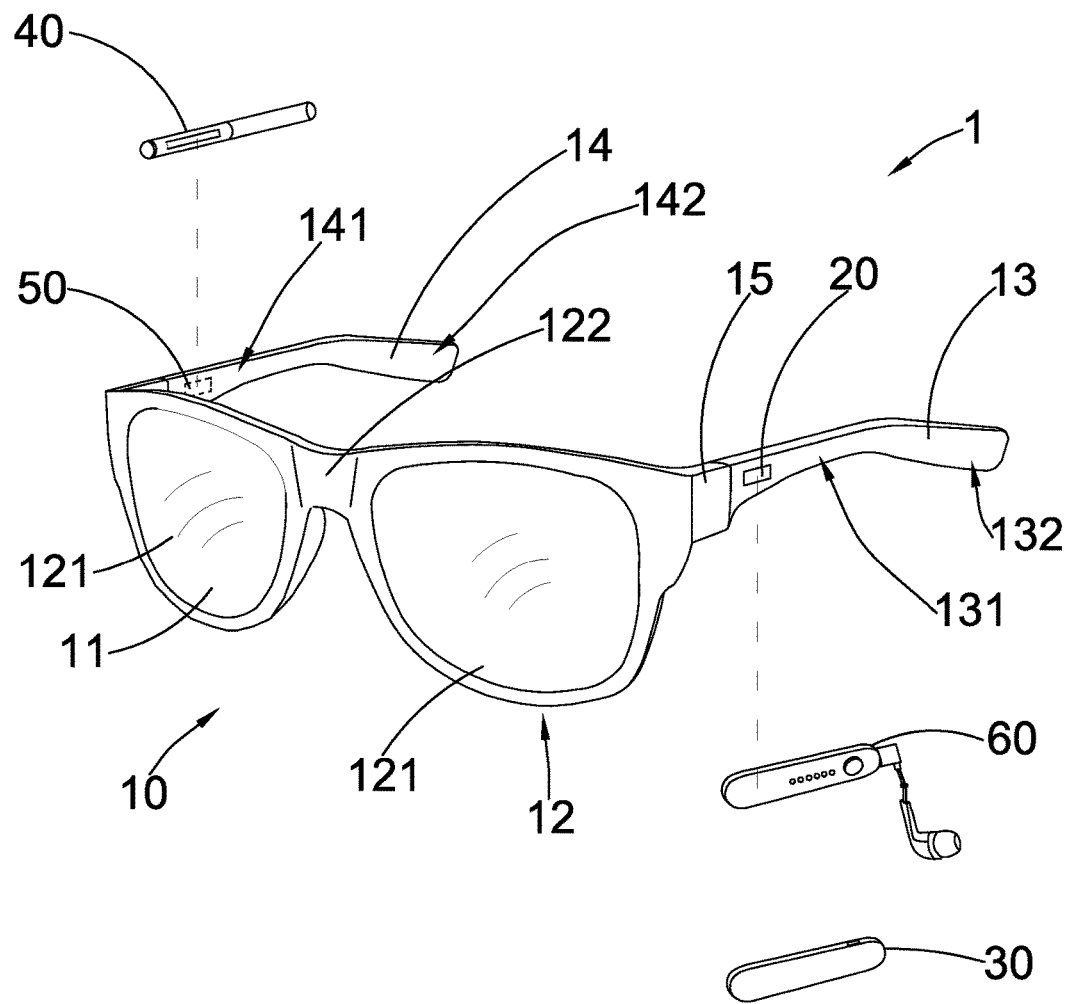
FIG. 1 is a perspective view of a spectacles set according to a preferred embodiment of the present invention.
Figure 2A:
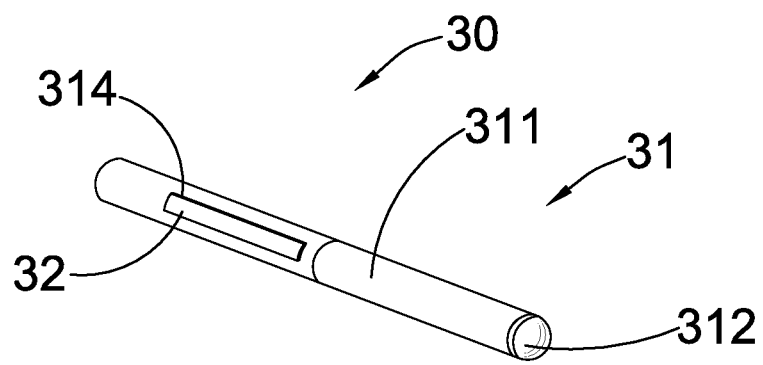
FIG. 2A and FIG. 2B are schematic diagrams of the first personal accessory of the spectacles set according to the preferred embodiment of the present invention.
Figure 2B:
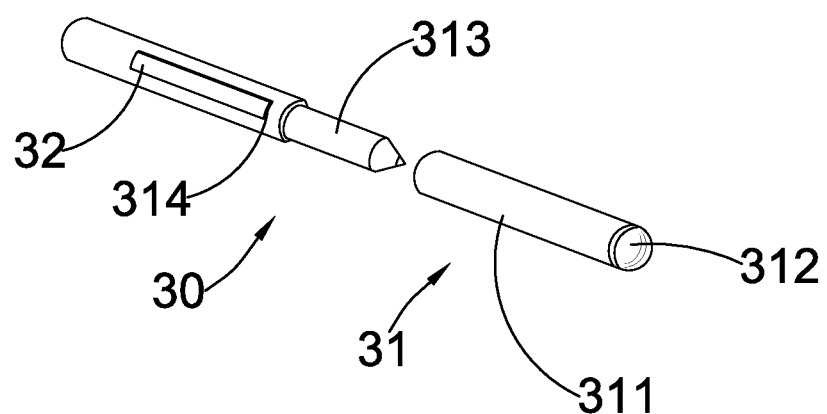

The following detailed description of the preferred embodiment is the preferred mode of carrying out the invention. The description is not to be taken in any limiting sense. It is presented for the purpose of illustrating the general principles of the present invention.

Referring to FIG. 1, FIG. 2A, FIG. 2B, FIG. 3A, FIG. 3B, FIG. 4A, FIG. 4B, and FIG. 5A to FIG. 5C of the drawings, a spectacles set 1 according a preferred embodiment of the present invention is illustrated. Broadly, the spectacles set 1 may comprise a spectacles article 10, a first frame magnetic element 20, a first personal accessory 30 and a second personal accessory 40. The spectacles set 1 may be utilized for accomplishing a plurality of predetermined utility functions, such as providing light or writing tools for a user of the present invention.

The spectacles article 10 may comprise a pair of spectacles lenses 11, a front frame 12, a first temple 13 and a second temple 14. The spectacles lenses 11 may be mounted on the front frame 12 for providing optical correction for the user wearing the spectacles article 10. The first temple 13 and the second temple 14 may rearwardly extend from two sides of the front frame 12 respectively.

The first frame magnetic element 20 may be provided on one of the first temple 13 and the second temple 14 at a position in the vicinity of the front frame 12.

The first personal accessory 30 may comprise a writing instrument 31 and a first accessory magnetic element 32 provided on the writing instrument 31.

The second personal accessory 40 may comprise a lighting device 41 and a second accessory magnetic element 42 provided on the lighting device 41. The writing instrument 31 and the lighting device 41 may be interchangably attached on the first frame magnetic element 20 so that at least one of the first personal accessory 30 and the second personal accessory 40 may be attached on the spectacles article 10 for providing a user with a utility option.

According to the preferred embodiment of the present invention, the spectacles article 10 may form conventional spectacles in which the spectacles lenses 11 may be configured for correcting short-sightedness, long-sightedness, or bi-focal. On the other hand, the spectacles lenses 11 may be configured to block ultraviolet radiation and sunlight. In that case, the spectacles article 10 may form a pair of sunglasses.

The front frame 12 may comprise two frame members 121 and a bridge 122 connecting between the two frame members 121. Each of the two frame members 121 may be configured as a loop for accommodating the corresponding spectacles lens 11. The first temple 13 and the second temple 14 may be connected to outer sides of the two frame members 121 through connectors 15 in a foldable manner respectively.

The first temple 13 may have a first elongated portion 131 rearwardly extended from the corresponding frame member 121, and a first hanging portion 132 extended from the first elongated portion 131 for hanging on a user's ear. Similarly, the second temple 14 may have a second elongated portion 141 rearwardly extended from the corresponding frame member 121, and a second hanging portion 142 extended from the second elongated portion 141 for hanging on user's another ear.

The spectacles set 1 of the present invention may further comprise a second frame magnetic member 50. The first frame magnetic member 20 and the second frame magnetic member 50 may be provided on the first temple 13 and the second temple 14 respectively. Specifically, each of the first frame magnetic member 20 and the second magnetic frame member 50 may be provided on the first elongated portion 131 of the first temple 13 and the second elongated portion 141 of the second temple 14 respectively at a position in the vicinity of the corresponding frame member 121. The purpose of the first frame magnetic member 20 and the second frame magnetic member 50 is to allow the corresponding personal accessory to be attached thereon.

As shown in FIG. 5A to FIG. 5C of the drawings, the first temple 13 may have a first attachment slot 133 indently formed on an inner side surface 134 (or outer side surface 135) for accommodating the first frame magnetic member 20. Similarly, the second temple 14 may have a second attachment slot 143 indently formed on an inner side surface 144 (or an outer side surface 145) for accommodating the second frame magnetic member 50.

It is worth mentioning that the first frame magnetic member 20 and the second frame magnetic member 50 may be attached on the first temple 13 and the second temple 14 in various ways. For example, the first frame magnetic member 20 and the second frame magnetic member 50 may be embedded in the first temple 13 and the second temple 14 respectively for exerting magnetic forces to the corresponding personal accessory (see FIG. 5B of the drawings). In addition, when the first frame magnetic member 20 and the second frame magnetic member 50 are installed inside the first temples 13 and the second temple 14, there is less chance for damages while the overall shapes and cosmetic designs of the spectacles article 10 may be kept. Alternatively, the first frame magnetic member 20 and the second frame magnetic member 50 may simply be attached on an inner side surface 134 (144) or an outer side surface 135 (145) of the first temple 13 and the second temple 14 respectively.

The first frame magnetic member 20 and the second magnetic frame member 50 may be configured to exert a predetermined amount of magnetic force to the first personal accessory 30 and the second personal accessory 40 so that they may be detachably attached to the first temple 13 and the second temple 14 respectively. For example, the first frame magnetic member 20 and the second frame magnetic member 50 may be configured as magnet, while the first accessory magnetic element 32 and the second accessory magnetic element 42 may be configured as iron. Alternatively, the first frame magnetic member 20 and the second frame magnetic member 50 may be configured as iron, while the first accessory magnetic element 32 and the second accessory magnetic element 42 may be configured as magnets.

The spectacles set 1 may further comprise a third personal accessory 60. The third personal accessory 60 may comprise an earphone device 61 and a third accessory magnetic element 62 provided on the earphone device 61. The third accessory magnetic element 62 may be detachably attached on the first frame magnetic member 20 or the second frame magnetic member 50. Thus, the spectacles set 1 of the present invention may have three personal accessories which may be available for the user to select and attach on the spectacles frame 10 in a manner described above.

In addition, the first frame magnetic member 20 and the second frame magnetic member 50 may be configured to be capable of attracting other small personal accessories such as screws, coins, nails, paper clips, or metal rulers. A user may attach any desired accessories onto the spectacles article 10.

Each of the first frame magnetic member 20 and the second frame magnetic member 50 may be detachably covered by a cover 16. The cover 16 may protect the corresponding first frame magnetic member 20 or the second frame magnetic member 50 and may act as decoration for the spectacles article 10. The cover 16 may also display the brand logo of the spectacles article 10.

Figure 4A:
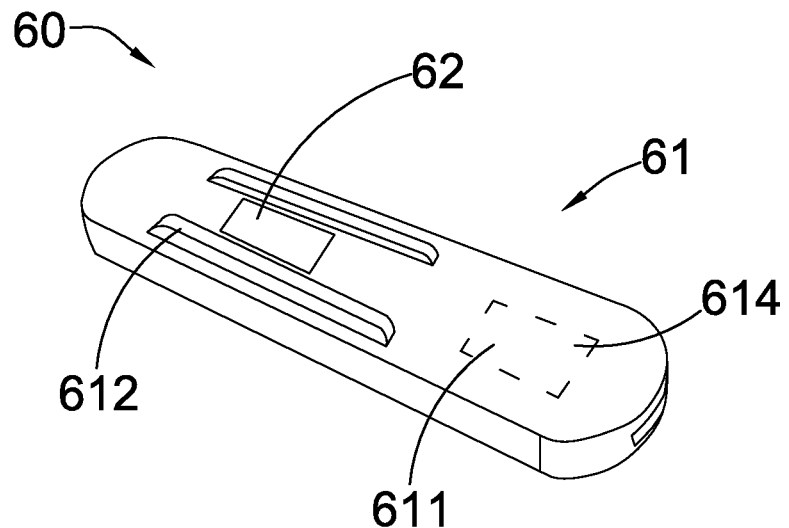
FIG. 4A and FIG. 4B are schematic diagrams of the third personal accessory of the spectacles set according to the preferred embodiment of the present invention.
Figure 4B:
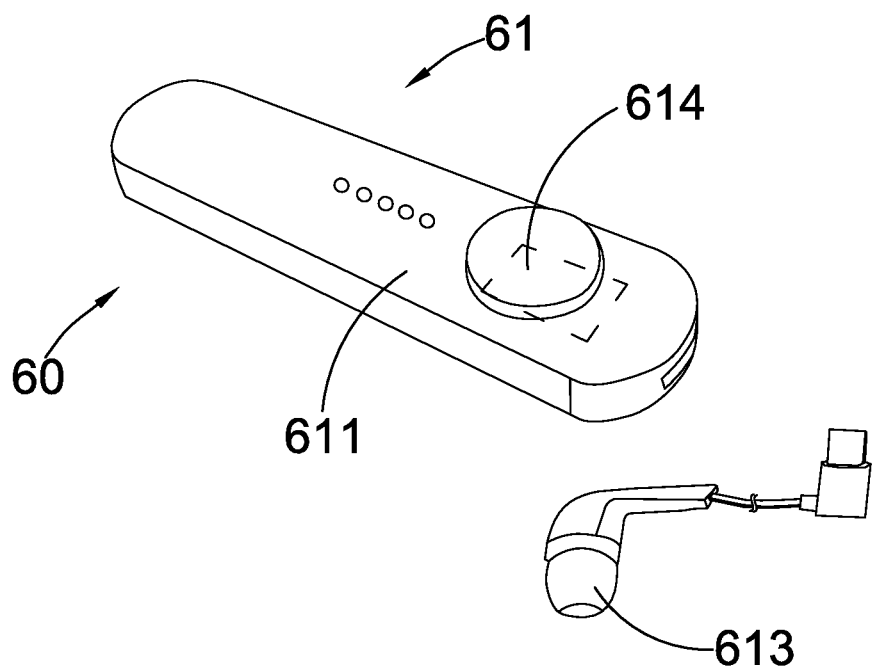

Referring to FIG. 4A to FIG. 4B of the drawings, the lighting device 41 of the second personal accessory 40 may comprise a main casing 411, and a plurality of guiding rails 412 formed on the main casing 411. A width between the guiding rails 412 may be slightly larger than a width of the corresponding the first elongated portion 131 of the first temple 13 or the second elongated portion 141 of the second temple 14, so that the corresponding elongated portion 131 (141) may slidably engage with the guiding rails 412.

On the other hand, the second accessory magnetic element 42 of the second personal accessory 40 may be provided at a position between the guiding rails 412 so that when the first temple 13 or the second temple 14 has slidably engaged with the guiding rails 412, the second accessory magnetic element 42 may be arranged to magnetically attracted to the first frame magnetic member 20 or the second frame magnetic member 50 for detachably attaching the second personal accessory 40 on the spectacles article 10. The lighting device 41 of the second personal accessory 40 may be configured as having an illuminator 413. The illuminator 413 may provide a light source such as a flash light or LED light.

When a user has the second personal accessory 40 attached on the spectacles article 10, it can provide a light source to enhance the visibility of the user. Traditional light source such as a torch requires the user's hand to operate. The attachment of the second personal accessory configured as a reading light may provide the user of the present invention a more convenient way to obtain a light source without using their hand.

Figure 3A:
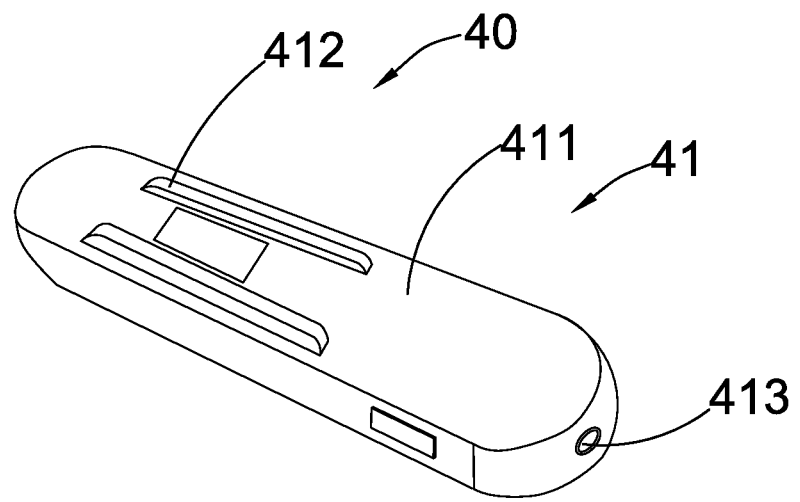
FIG. 3A and FIG. 3B are schematic diagrams of the second personal accessory of the spectacles set according to the preferred embodiment of the present invention.
Figure 3B:
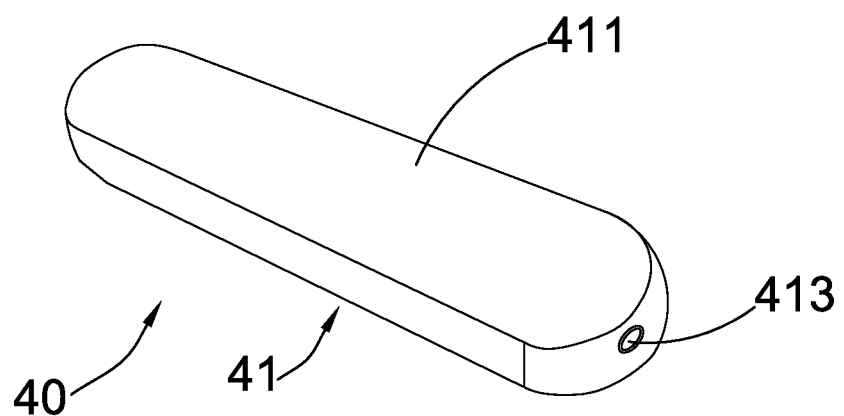

Referring to FIG. 3A and FIG. 3B of the drawings, the writing instrument 31 of the first personal accessory 30 may form a conventional pen for writing or a pointing device for a tablet or a touchscreen enabled cell phone. Specifically, the writing instrument 31 may comprise an elongated pen housing 311 and a touchscreen pointer 312 formed at an end of the elongated pen housing 311. The first accessory magnetic element 32 may be provided on the elongated pen housing 311 and may be arranged to magnetically attract to the first frame magnetic member 20 or the second frame magnetic member 50.

Furthermore, the writing instrument 31 may further comprise a pen 313 detachably received in the elongated pen housing 311. A user may selectively retrieve the pen 313 from the elongated pen housing 311 for writing on a paper for example. The writing instrument 31 may further comprise a plurality of sliding rails 314 formed on the elongated pen housing 311 for stabilizing and aligning with the corresponding first temple 13 or the second temple 14 of the spectacles article 10. The first accessory magnetic element 32 may be provided on the elongated pen housing 311 at a position between the sliding rails 314. When the first temple 13 or the second temple 14 has slidably engaged with the sliding rails 314, the first accessory magnetic element 32 may be arranged to magnetically attracted to the first frame magnetic member 20 or the second frame magnetic member 50 for detachably attaching the first personal accessory 30 on the spectacles article 10.

Referring to FIG. 4A to FIG. 4B of the drawings, the third personal accessory 60 may comprise the earphone device 61 and the third accessory magnetic element 62. The earphone device 61 may comprise earphone housing 611, a plurality of mounting rails 612, and an earpiece 613 connected to the earphone housing 611. The third accessory magnetic element 62 may be provided on the earphone housing 611 at a position in a space between the mounting rails 612. When the first temple 13 or the second temple 14 has slidably engaged with the mounting rails 612, the third accessory magnetic element 62 may be arranged to magnetically attracted to the first frame magnetic member 20 or the second frame magnetic member 50 for detachably attaching the first personal accessory 30 on the spectacles article 10.

The earphone 61 may further comprise a Bluetooth module 614 for wirelessly connecting to an external electronic device.

FIG. 1 of the drawings illustrates that the user may attach two sets of personal accessories on the spectacles article 10 at the same time. For the example, as shown in FIG. 1 of the drawings, a lighting device 41 and a writing instrument 31 may be simultaneously attached on the first temple 13 and the second temple 14 respectively.

The spectacles article 10 and the first through third personal accessories 30, 40, 60 may be sold and manufactured as a spectacles set so that a user may pick any one or two of the personal accessories and attach it (them) on the first temple 13 and/or the second temple 14.

The present invention, while illustrated and described in terms of a preferred embodiment and several alternatives, is not limited to the particular description contained in this specification. Additional alternative or equivalent components could also be used to practice the present invention.

What is claimed is:

1. A spectacles set, comprising:
    a spectacles article, which comprises:
    a pair of spectacles lenses;
    a front frame, said spectacles lenses mounting on said front frame;
    a first temple and a second temple rearwardly extended from two sides of said front frame respectively, said first temple having a first elongated portion rearwardly extended from said corresponding front frame, and a first hanging portion extended from said first elongated portion, said second temple having a second elongated portion rearwardly extended from said corresponding front frame, and a second hanging portion extended from said second elongated portion;
    a first frame magnetic member provided on one of said first temple and said second temple at a position in the vicinity of said front frame;
    a second frame magnetic member, said first frame magnetic member and said second frame magnetic member being provided on said first elongated portion of said first temple and said second elongated portion of said second temple at a position in a vicinity of said corresponding front frame;
    a first personal accessory which comprises a writing instrument and a first accessory magnetic member provided on said writing instrument;
    a second personal accessory which comprises a lighting device and a second accessory magnetic member provided on said lighting device, said writing instrument and said lighting device being interchangably attached on said first frame magnetic member so that at least one of said first personal accessory and said second personal accessory is attached on said spectacles article for providing a user with a utility option; and
    a third personal accessory which comprise an earphone device and a third accessory magnetic member provided on said earphone device, said third accessory magnetic member being detachably and selectively attached on one of said first frame magnetic member and said second frame magnetic member,
    wherein said lighting device of said second personal accessory comprises a main casing, an illuminator provided on said main casing, and a plurality of guiding rails formed on said main casing, a width between said guiding rails being slightly larger than a width of said corresponding said first elongated portion of said first temple and said second elongated portion, said second accessory magnetic member being provided at a position between said guiding rails.

2. A spectacles set, comprising:

a spectacles article, which comprises:

a front frame;

a first temple and a second temple rearwardly extended from two sides of said front frame respectively, said first temple having a first elongated portion rearwardly extended from said corresponding front frame, and a first hanging portion extended from said first elongated portion, said second temple having a second elongated portion rearwardly extended from said corresponding front frame, and a second hanging portion extended from said second elongated portion, a first frame magnetic member provided on one of said first temple and said second temple at a position in the vicinity of said front frame;

a second frame magnetic member, said first frame magnetic member and said second frame magnetic member being provided on said first elongated portion of said first temple and said second elongated portion of said second temple at a position in a vicinity of said corresponding front frame;

a first personal accessory which comprises a writing instrument and a first accessory magnetic member provided on said writing instrument;

a second personal accessory which comprises a lighting device and a second accessory magnetic member provided on said lighting device, said writing instrument and said lighting device being interchangably attached on said first frame magnetic member so that at least one of said first personal accessory and said second personal accessory is attached on said spectacles article for providing a user with a utility option; and a third personal accessory which comprise an earphone device and a third accessory magnetic member provided on said earphone device, said third accessory magnetic member being detachably and selectively attached on one of said first frame magnetic member and said second frame magnetic member, wherein said lighting device of said second personal accessory comprises a main casing, an illuminator provided on said main casing, and a plurality of guiding rails formed on said main casing, a width between said guiding rails being slightly larger than a width of said corresponding said first elongated portion of said first temple and said second elongated portion, said second accessory magnetic member being provided at a position between said guiding rails.

* * * * *